(12) United States Patent
Smith et al.

(10) Patent No.: US 7,177,713 B2
(45) Date of Patent: Feb. 13, 2007

(54) METHOD AND SYSTEM FOR OPTIMIZING MANUFACTURE OF PARTS

(75) Inventors: Kevin Scott Smith, Huntersville, NC (US); Robert Gerard Wilhelm, Charlotte, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 298 days.

(21) Appl. No.: 10/082,558

(22) Filed: Feb. 25, 2002

(65) Prior Publication Data
US 2003/0163212 A1 Aug. 28, 2003

(51) Int. Cl.
*G06F 19/00* (2006.01)
(52) U.S. Cl. ............................. 700/97; 700/95; 700/99; 703/6; 705/8; 705/26; 235/376
(58) Field of Classification Search .................. 700/95, 700/97, 99, 100, 106–108; 705/29, 8, 26, 705/28, 30, 37; 707/1, 104, 5; 703/1; 235/376
See application file for complete search history.

(56) References Cited

U.S. PATENT DOCUMENTS 5,388,199 A * 2/1995 Kakazu et al. .............. 715/853
RE36,602 E * 3/2000 Sebastian et al. ............. 700/97
6,295,513 B1 * 9/2001 Thackston ..................... 703/1
6,470,228 B1 * 10/2002 Turner et al. ................. 700/97

\* cited by examiner

*Primary Examiner*—Leo Picard
*Assistant Examiner*—Sheela S. Rao
(74) *Attorney, Agent, or Firm*—Kilpatrick Stockton LLP

(57) ABSTRACT

The present invention discloses a method and system comprised of a combination of submethods and subsystems relating to the manufacture of parts. By these submethods and subsystems, the present invention discloses using part data, machine data, and tool data to create a recipe for the production of a part. Also included in the recipe is an optimal combination of machine and tooling derived from a database of machine and tooling performance measurements. Further included in the recipe are a process plan and production settings. A party can select or create a vendor by using the recipe and a database of vendor information. Also disclosed by the present invention is monitoring of the machining setup and production to ensure manufacture of the part according to the recipe. The present invention can be implemented in numerous methods and systems, including sales of the recipe and licensing of the part production according to the recipe.

20 Claims, 15 Drawing Sheets

Vendor Creation

Monitoring

METHOD AND SYSTEM FOR OPTIMIZING MANUFACTURE OF PARTS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention generally relates to methods and systems for manufacturing and constructing objects. More particularly, it relates to methods and systems for manufacturing and constructing parts which must meet specific characteristics and qualities by manufacturing and construction requirements.

BACKGROUND OF THE INVENTION

The conventional manufacturing process of a part begins at the design stage. During the design stage, a party that desires a part sets certain requirements for the part. The part may have certain size and shape requirements, it may need to be made from a specific material, and it may have necessary hardness and conductivity limits. Once a party establishes a description of the finished product with any additional requirements, the party must ascertain the manner of physical construction of the part.

During the construction stage, a party (which may or may not be the same party that desires the part) must select a machine and must design and manufacture tooling or select tooling to be used with the machine. The party must set up the machine with the tooling and materials. Once the machine is set up with the tooling and materials, the party can begin the physical production of the part.

As the part is produced, the machine operator may need to change or replace tooling and adjust the machining process. Through this construction process, or numerous cycles of this process, the part is manufactured.

The conventional systems and methods for manufacturing parts rely primarily on human experience to select settings, such as speed and temperature, and require a party to adjust the machining process to account for problems that arise. As machines become faster, stronger, and more complex, users often incorrectly use and, often, under-use the machines.

Moreover, machined-product purchasers encounter problems using multiple contractors that use varying materials and varying machining processes that result in parts with different characteristics and qualities. Such problems result in a high percentage of rejected parts, wasted time in attempting to use varying parts, and other challenges.

Part manufactures have made various attempts to solve these problems. Such conventional solutions include the reduction of speeds, rates, and depths of cut to prevent vibrations or chatter, decrease tool wear, and produce smoother surfaces, thereby under-using a machine. Other attempts to solve the problems of conventional systems and methods include outsourcing the manufacture of a part or hiring a consultant to suggest adjustments to the machining process, but these methods also lead to adjustments that result in under-use, and inefficient use, of machines.

There is, accordingly, a need in the art for an improved method and system for the manufacture of parts, for selecting a vendor capable of producing the parts, and for determining an optimal machine and tooling combination.

SUMMARY OF THE INVENTION

The previously mentioned problems are resolved, and additional advantages obtained, by an embodiment of the present invention, a method and system comprised of a combination of submethods and subsystems relating to the manufacture of parts. One embodiment of the present invention comprises all of the necessary elements of the process and structure required for the manufacturing of a part. Each submethod comprises decisions to be made and considered when manufacturing a part. Each subsystem comprises elements of a structure to manufacture parts. The subparts are related in such a way as to resolve many of the problems that arise in the manufacturing of a part.

In an embodiment, a party specifies the requirements for a part to be manufactured. The part may need to be made of a certain material, have a minimum hardness, or fit within a larger structure such as an engine. These part specifications comprise the part data.

In addition to part data, a party (this party, as all the actors denoted as a party herein, may be the same or different than other acting parties) also specifies machine and tool data. The party selects the machine data based on required or desired characteristics of the part. Possible machines must be large enough and powerful enough, as well as meet other minimum requirements, to be able to produce the part. All of the machine requirements comprise the machine data.

A party selects the tool data based upon required or desired characteristics. These part characteristics are the tool data.

From the part data, machine data, and tool data, a party creates a recipe. A recipe, or process plan, comprises a description of the production of a part. A party creates the recipe defining the part, machine, and tool data to produce an efficient machine and tool combination, process plan, and production setup. During the recipe generation stage, the party evaluates each individual characteristic related to the part, machine, and tooling. By cumulatively evaluating and balancing multiple factors, and recording decisions made, a party accomplishes generating a recipe.

The party generating the recipe chooses a combination of machine and tooling which is best suited for producing the part. This choice will require the party to select a machine and tooling combination which can efficiently produce the part at the upper bound of the machine and tooling combination capability. The party can maintain a database to facilitate choosing a machine and tooling combination. From the database, a party can identify optimal specific machines, tools, and combinations of machines and tools and optimal classes of machines, tools, and combinations of machines and tools for a particular part.

Once a party has chosen an optimal machine and tooling to manufacture the part, the party must then determine the process path and production settings to produce the part using the selected machine and tooling. The process path is the sequence of machined features. The production settings are the values by which the machine will fabricate the part.

In an embodiment, this collection of information (the part data, machine data, tool data, optimal machine and tooling, process path, and production settings) comprises the recipe, which contractors or vendors can use in the manufacture of the part. After a party has generated the recipe, either the party desiring the part or a third party can select a vendor to execute the recipe and create the part.

Choosing a vendor requires a party to have knowledge of a vendor with the required equipment and sufficient capabilities to execute the recipe and create the desired quantity of parts. The party may maintain or access a database of vendors. The party or other entity may update this database to adapt to changing requirements, available equipment, and operating vendors. If multiple vendors are capable of executing the recipe, the party may select from those vendors based upon advantageous factors and characteristics.

If the party does not know of, and the database does not contain, an existing capable vendor, the party may create a vendor by specifying, from the recipe, the required equipment, machine and tooling, and assembling such a vendor must possess and be capable of carrying out. The party may also create a vendor by supplementing existing vendors with (or suggesting the purchase or lease of) additional equipment required to manufacture the part according to the recipe.

Once a party generates the recipe and selects a vendor, the vendor can begin production of the part according to the recipe. During the execution of the recipe by the vendor, the party desiring the part or a third party may monitor the production of the part. A party may monitor aspects of the production of the part by any convenient means, such as by contacting the vendor or subcontractor, by visiting the production site, remotely via the Internet, or by testing post-production parts. This monitoring effectively ensures production of the party according to execution of the recipe.

Contractors may implement the above-described system and method for the manufacture of parts to ensure greater productivity, decease production costs, and ensure greater uniformity of parts. In an embodiment of the present invention, contractors generate the recipe, allow vendors or subcontractors to bid on the production of the part according to the recipe, and license a vendor or subcontractor to produce the parts according to the recipe. Such an embodiment provides the contractor the benefit of knowing that the vendor or subcontractor is capable of producing the part and assures that the part will be made efficiently according to the recipe. Such embodiment also provides the vendor or subcontractor the benefit of knowing how to produce the part. The license of such an embodiment may include a payment provision to the vendor or subcontractor if the part is produced according to the recipe, even if the recipe fails to produce the desired part. Such a license term would benefit the vendor or subcontractor such that they are essentially guaranteed payment if they produce the part according to the recipe.

In another embodiment of the present invention, a third party generates a recipe for the construction of a part desired by a contractor and license or sells the recipe to a vendor or subcontractor to use in the production of the part. A similar embodiment exists in which a vendor or subcontractor hires a third party to generate a recipe that may be used by the vendor or subcontractor when bidding on a contractor's request for a new part.

The present invention provides an improved method and system for determining an optimal machine and tooling combination as well as an efficient production process and for selecting a vendor capable of producing the parts. As such, the present invention solves problems and provides a need in the field of manufacturing parts not provided by conventional and other known manufacturing systems and methods. Other aspects, objects, and advantages of various embodiments of the present invention will be appreciated by those of ordinary skill in the art upon review of the specification herein.

DETAILED DESCRIPTION OF THE INVENTION

Figure 1:
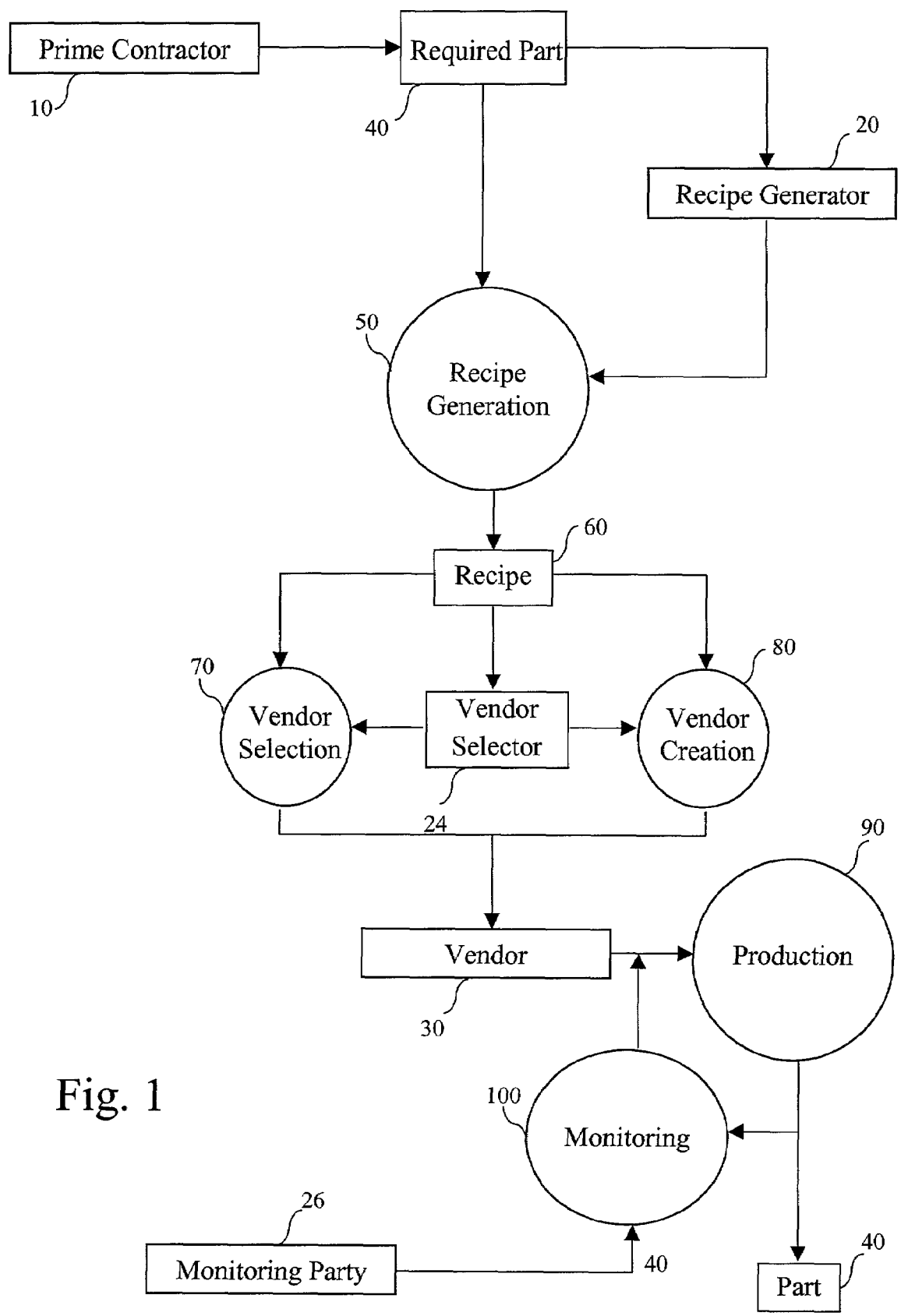
FIG. 1 comprises a diagram showing an embodiment of a manufacturing process of the present invention for manufacturing parts.

Detailed descriptions of embodiments of the present invention are disclosed herein; however, it is to be understood that the disclosed embodiments are merely exemplary of the invention that may be embodied in various and alternate forms. Some features of the figures may be exaggerated or minimized to show details and relationships of particular components. Therefore, specific structural and functional details disclosed herein are not to be interpreted as limiting, but merely as a basis for the claims and as a representative basis for teaching one skilled in the art to variously employ the present invention.

One embodiment of the present invention comprises all of the necessary elements of the process and structure required for the manufacturing of a part. Each submethod comprises decisions to be made and considered when manufacturing a part. Each subsystem comprises elements of a structure to manufacture parts. The subparts are related in such a way as to resolve many of the problems that arise in the manufacturing of a part.

In an embodiment, a party specifies the requirements for a part to be manufactured. The part may need to be made of a certain material, have a minimum hardness, or fit within a larger structure such as an engine. These part specifications comprise the part data.

In addition to part data, a party (this party, as all the actors denoted as a party herein, may be the same or different than other acting parties) also specifies machine and tool data. The party selects the machine data based on required or desired characteristics of the part. Possible machines must be large enough and powerful enough, as well as meet other minimum requirements, to produce the part. All of the machine requirements comprise the machine data.

A party selects the tool data based upon required or desired characteristics. These part characteristics are the tool data.

From the part data, machine data, and tool data, a party creates a recipe. A recipe, or process plan, comprises a description of the production of a part. A party creates the recipe defining the part, machine, and tool data to produce an efficient machine and tool combination, process plan, and production setup. During the recipe generation stage, the party evaluates each individual characteristic related to the part, machine, and tooling. By cumulatively evaluating and balancing multiple factors, and recording decisions made, a party accomplishes generating a recipe.

The party generating the recipe chooses a combination of machine and tooling which is best suited for producing the part. This choice will require the party to select a machine and tooling combination which can efficiently produce the part at the upper bound of the machine and tooling combination capability. The party can maintain a database to facilitate choosing a machine and tooling combination. From the database, a party can identify optimal specific machines, tools, and combinations of machines and tools and optimal classes of machines, tools, and combinations of machines and tools.

Once a party has chosen an optimal machine and tooling to manufacture the part, the party must then determine the process path and production settings to produce the part using the selected machine and tooling. The process path is the sequence of machined features. The production settings are the values by which the machine will fabricate the part.

In an embodiment, this collection of information (the part data, machine data, tool data, optimal machine and tooling, process path, and production settings) comprises the recipe, which contractors or vendors can use in the manufacture of the part. After a party has generated the recipe, either the party desiring the part or a third party can select a vendor to execute the recipe and create the part.

Choosing a vendor requires a party to have knowledge of a vendor with the required equipment and sufficient capabilities to execute the recipe and create the desired quantity of parts. The party may maintain or access a database of vendors. The party or other entity may update this database to adapt to changing requirements, available equipment, and operating vendors. If multiple vendors are capable of executing the recipe, the party may select from those vendors based upon advantageous factors and characteristics.

If the party does not know of, and the database does not contain, an existing capable vendor, the party may create a vendor by specifying, from the recipe, the required equipment, machine and tooling, and assembling such a vendor must possess and be capable of carrying out. The party may also create a vendor by supplementing existing vendors with (or suggesting the purchase or lease of) additional equipment required to manufacture the part according to the recipe.

Once a party generates the recipe and selects a vendor, the vendor can begin production of the part according to the recipe. During the execution of the recipe by the vendor, the party desiring the part or a third party may monitor the production of the part. A party may monitor aspects of the production of the part by any convenient means, such as by contacting the vendor or subcontractor, by visiting the production site, remotely via the Internet, or by testing post-production parts. This monitoring effectively ensures production of the party according to execution of the recipe.

Contractors may implement the above-described system and method for the manufacture of parts to ensure greater productivity, decease production costs, and ensure greater uniformity of parts. In an embodiment of the present invention, contractors generate the recipe, allow vendors or subcontractors to bid on the production of the part according to the recipe, and license a vendor or subcontractor to produce the parts according to the recipe. Such an embodiment provides the contractor the benefit of knowing that the vendor or subcontractor is capable of producing the part and assures that the part will be made efficiently according to the recipe. Such embodiment also provides the vendor or subcontractor the benefit of knowing how to produce the part. The license of such an embodiment may include a payment provision to the vendor or subcontractor if the part is produced according to the recipe, even if the recipe fails to produce the desired part. Such a license term would benefit the vendor or subcontractor such that they are essentially guaranteed payment if they produce the part according to the recipe.

In another embodiment of the present invention, a third party generates a recipe for the construction of a part desired by a contractor and license or sells the recipe to a vendor or subcontractor to use in the production of the part. A similar embodiment exists in which a vendor or subcontractor hires a third party to generate a recipe that may be used by the vendor or subcontractor when bidding on a contractor's request for a new part.

Referring now to the drawings wherein like elements are assigned like reference numerals, embodiments of the present invention are described further. FIG. 1 shows a schematic of a part-generation system and method according to the present invention. Embodiments of sub-systems and sub-processors within the system and method shown in FIG. 1 are described further below with reference to other figures.

Referring to FIG. 1, a prime contractor (or buyer, or purchaser) 10 is in need of or requires a particular part 40. Part 40 can be intended for any application in any product. The part 40 may be a product produced and sold by the prime contractor 10 or may be one of many parts required to assemble a product produced and sold by the prime contractor 10. For example, an airplane manufacturer requires numerous parts to assemble an airplane such as those in the group of screw, food tray, hinge, fuel door, and nose cone. Other larger portions of an airplane are assembled from multiple parts. For example, landing gear is assembled from at least some of the parts in the group of metal frame, wheel, tire, bearing, and axle. The prime contractor 10 may be an airplane manufacturer that assembles the landing gear or may be a manufacturer that specializes in landing gear and sells the landing gear to an airplane manufacturer.

Prime contractor 10, or a recipe-generating third-party 20, creates a recipe 60 for the required part 40 by way of a recipe generation step 50. In the embodiment shown, the recipe-generating third-party 20 is a sub-contractor with knowledge of the part 40. The recipe-generation step is described further below with reference to FIG. 7.

Figure 8:
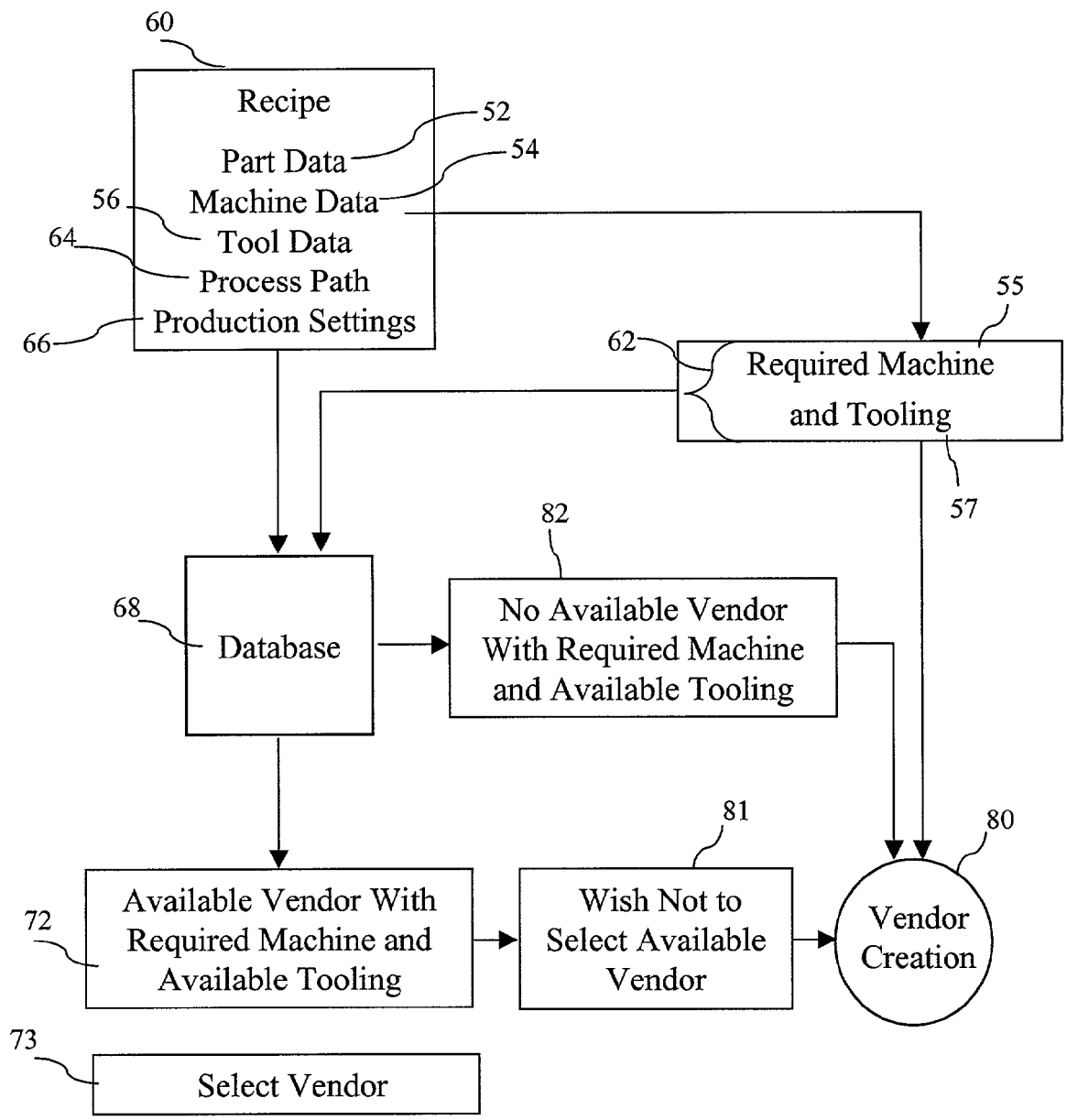
FIG. 8 comprises a schematic of vendor selection of FIGS. 1 to 6.
Figure 9:
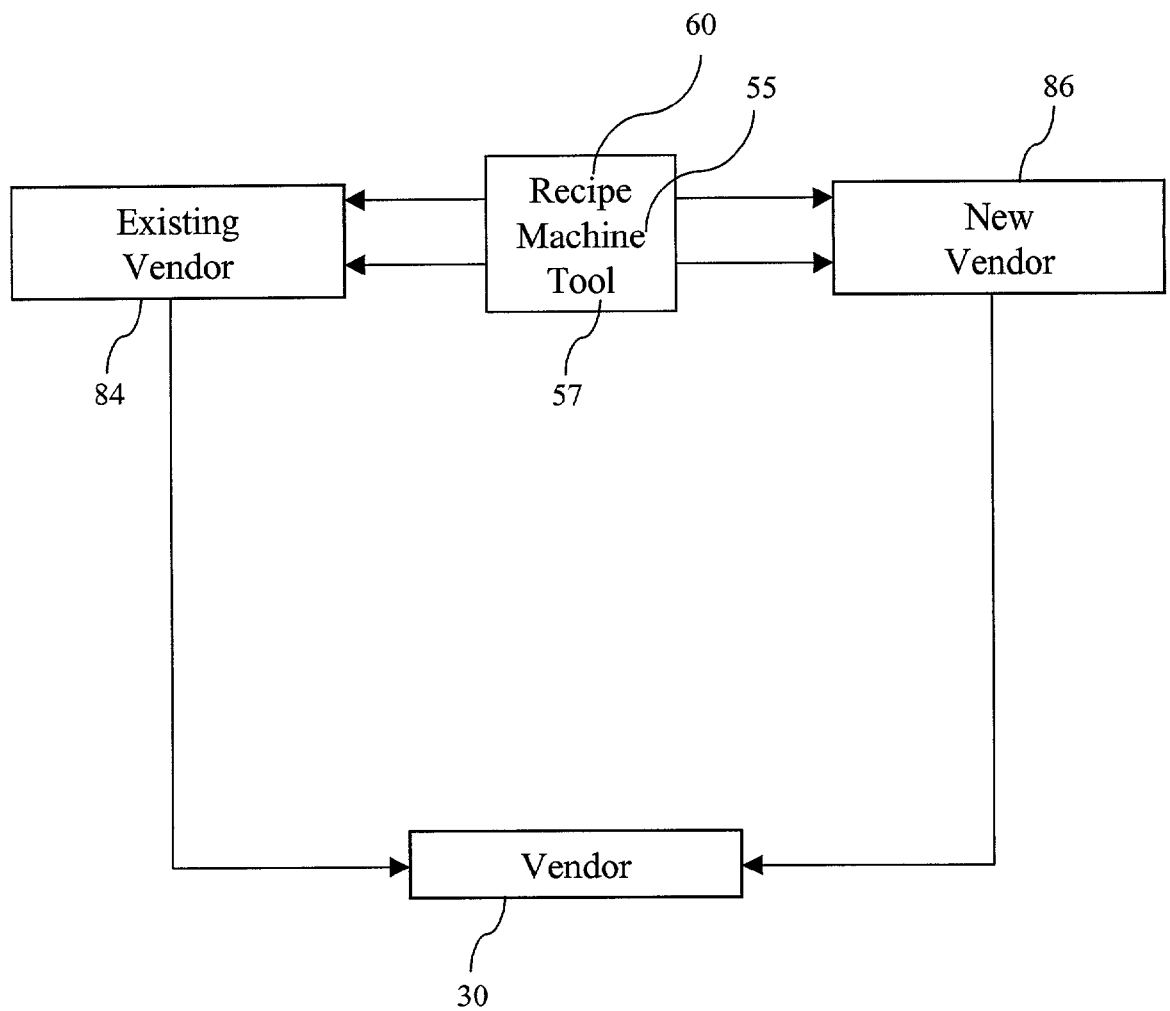
FIG. 9 comprises a detailed schematic of vendor creation of FIG. 8.

After generating the recipe 60, a vendor selector 24 uses the recipe 60 to select or create a vendor (or subcontractor) 30 either by a vendor-selection process 70 or a vendor-creation process 80. In the embodiment shown in FIG. 1, the vendor selector 24 is the sub-contractor 20 that generated the recipe 60. The vendor selector 24 may be any party, including the prime contractor 10, third party 20, other third parties 22, 28 denoted in FIGS. 1–6, or any other person or entity. Preferably, the vendor selector 24 has knowledge and experience in relation to the part 40 and relevant vendors. A vendor-selection process is shown in FIG. 8. A vendor-creation process is shown in FIG. 9.

Referring still to FIG. 1, the recipe generated 60 is provided to the vendor 30, and the vendor 30 uses the recipe 60 in a production stage 90 to fabricate the desired part 40. Production comprises using the machine(s) tool(s), settings, and other directions in the recipe 60 to construct the part 40.

Figure 11:
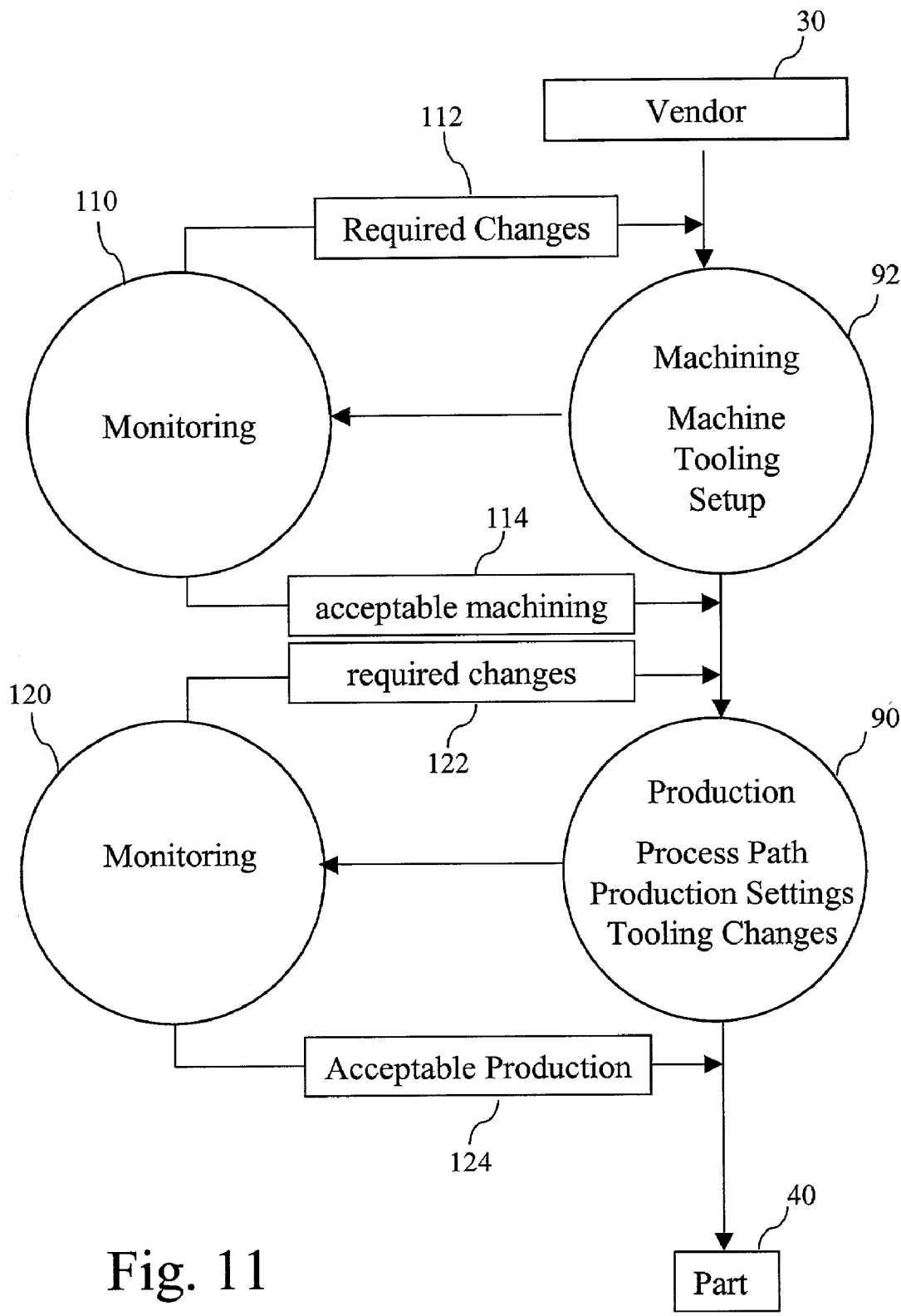
FIG. 11 comprises a schematic showing monitoring which can be performed by a party during the production of a part of an embodiment of the present invention for the production of a part.

While the vendor 30 carries out the production stage 90, a production-process monitor monitors 100 the production of the part 40 to ensure that vendor 30 is producing the part 40 according to the recipe 60. The monitor 26 is the recipe-generating sub-contractor 20 in the embodiment shown in FIG. 1. Any party, including the prime contractor 10 can perform monitoring 100 of the production 90 of the part 40 by the vendor 30. The monitoring process comprises observing or gathering data associated with the production step 90 in order to assure proper construction of the part 40. A monitoring process is shown in FIG. 11.

Figure 2:
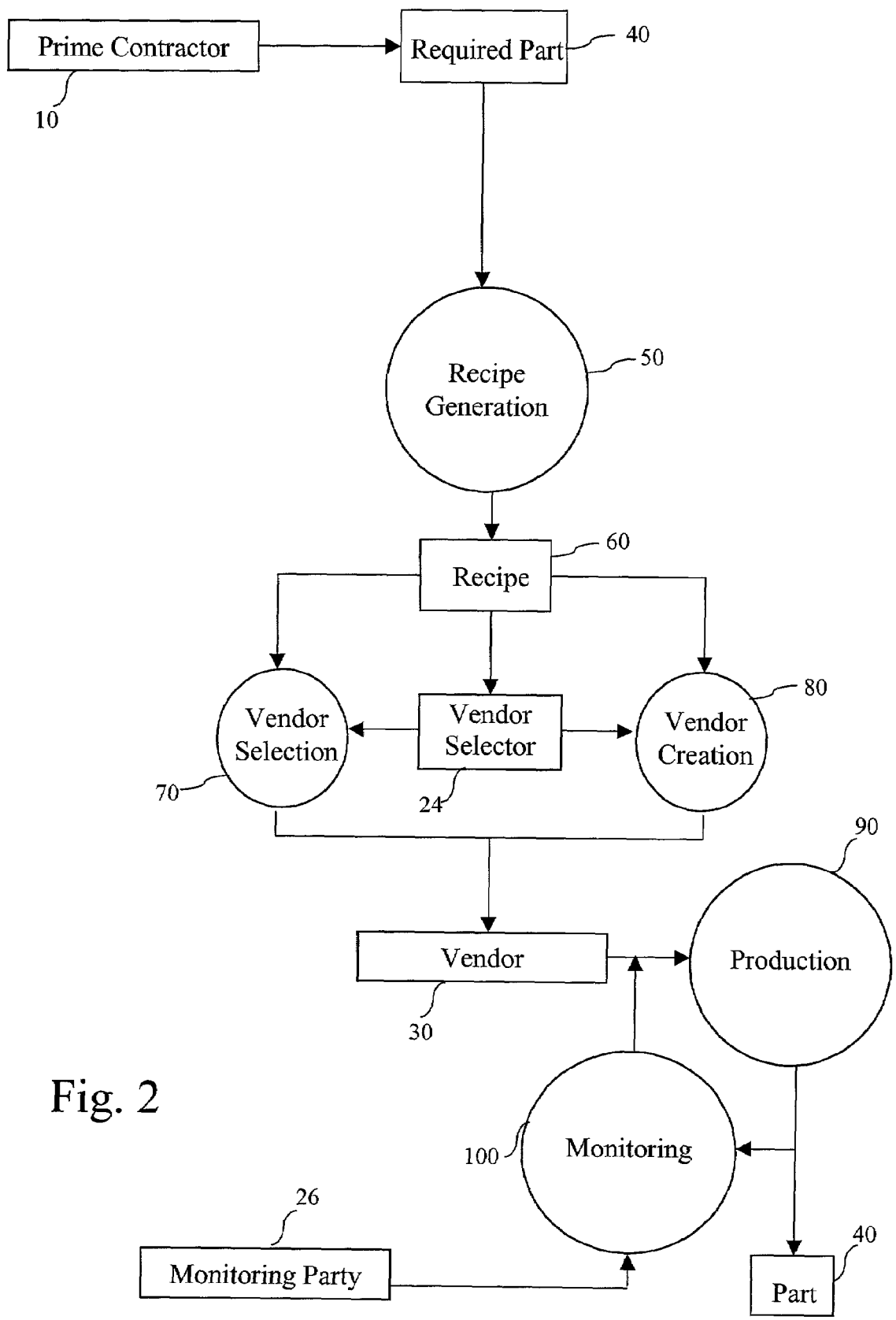
FIG. 2 comprises a diagram showing another embodiment of a manufacturing process of the present invention for manufacturing parts.
Figure 3:
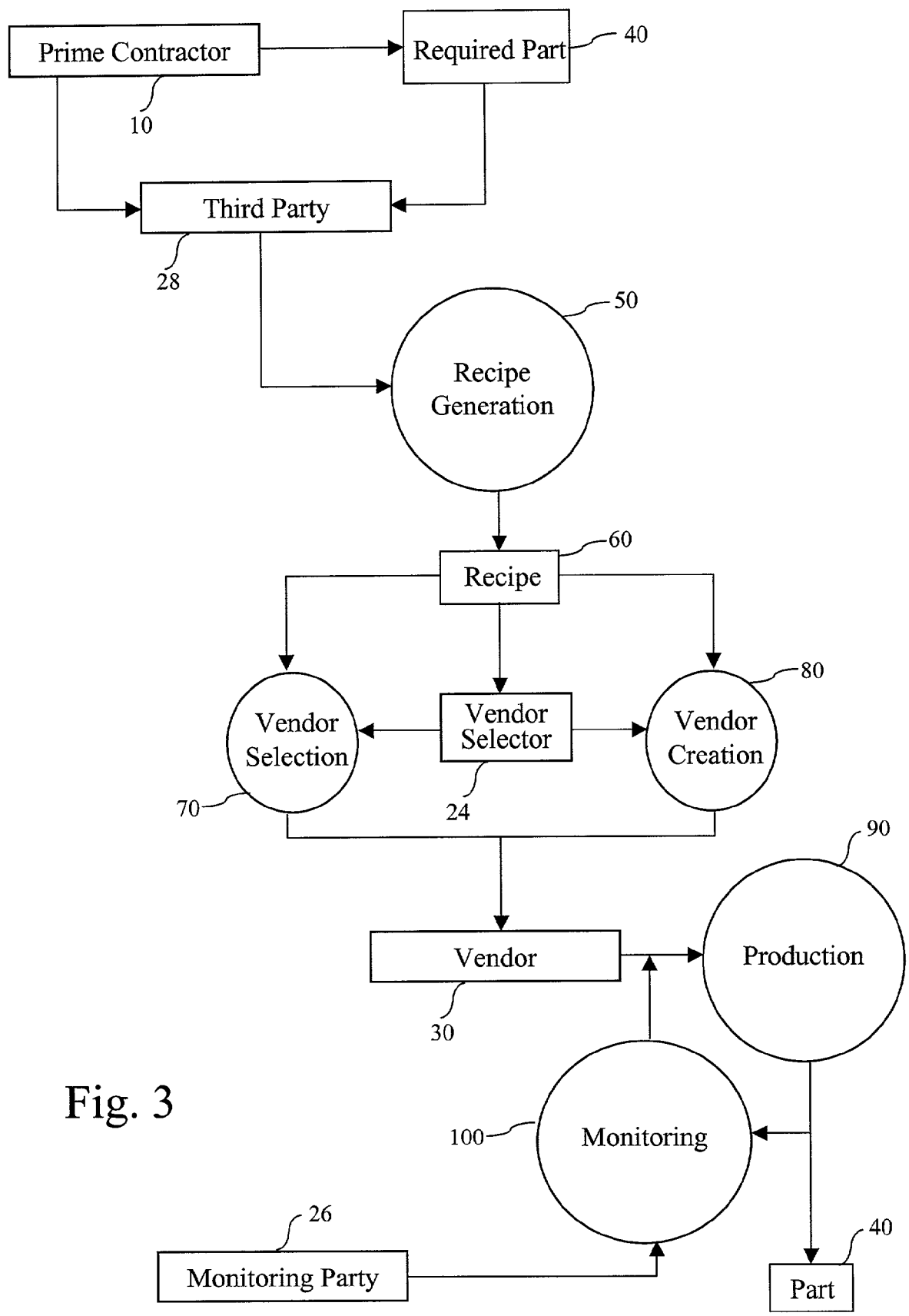
FIG. 3 comprises a diagram showing another embodiment of a manufacturing process of the present invention for manufacturing parts.
Figure 4:
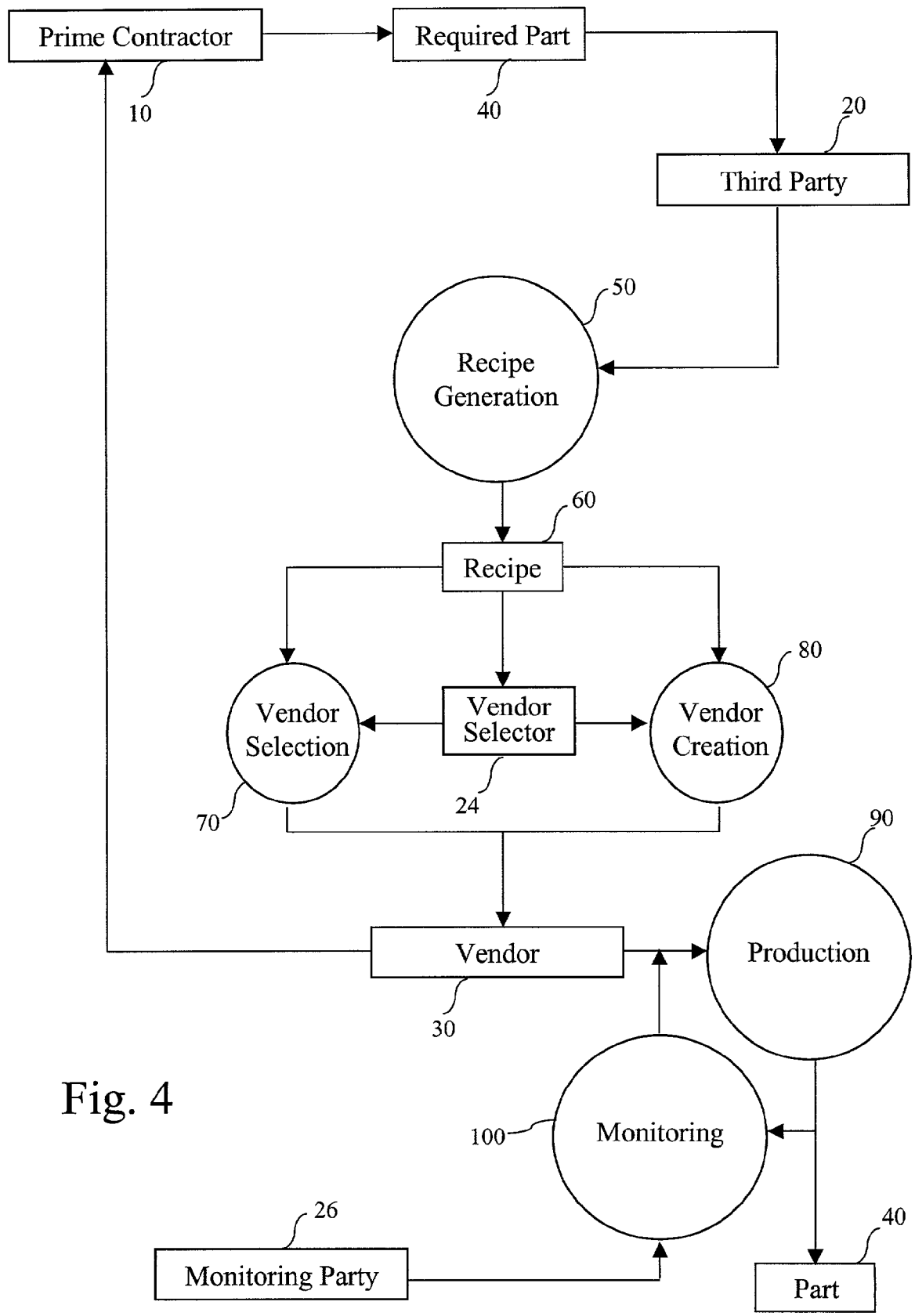
FIG. 4 comprises a diagram showing another embodiment of a manufacturing process of the present invention for manufacturing parts.
Figure 5:
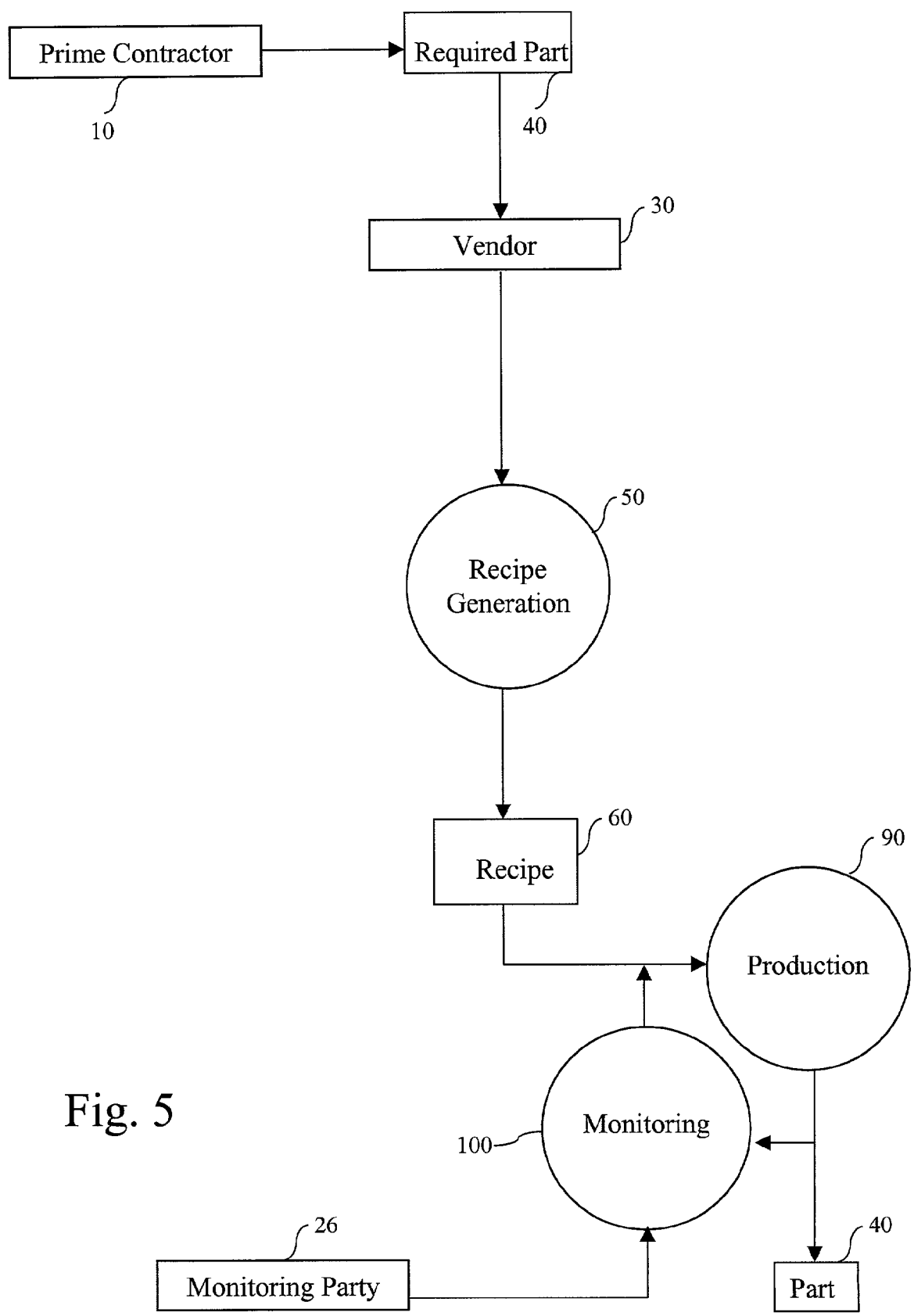
FIG. 5 comprises a diagram showing another embodiment of a manufacturing process of the present invention for manufacturing parts.
Figure 6:
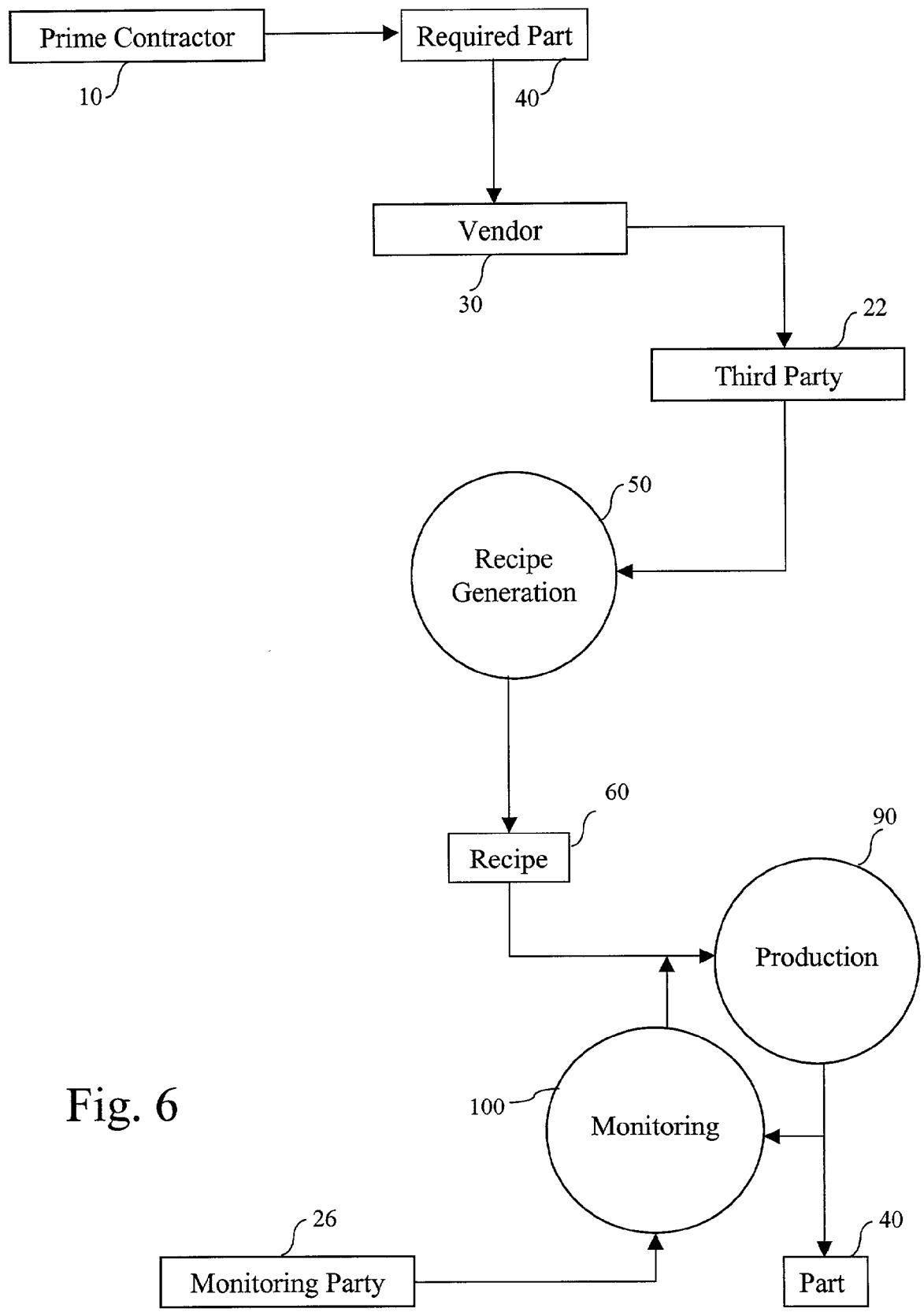
FIG. 6 comprises a diagram showing another embodiment of a manufacturing process of the present invention for manufacturing parts.

FIGS. 2–6 show various embodiments of the present invention similar to that which is shown in FIG. 1, except that differing persons or entities generate the recipe, and the various persons or entities undertake related action. FIG. 2 shows an embodiment of the present invention in which the prime contractor alone 10 generates the recipe 60. FIG. 3 shows an embodiment in which the prime contractor 10 hires the third party 28 to generate a recipe 60 for the prime contractor 10 from a general part description provided by the contractor 10. Another embodiment of the present invention, represented in FIG. 4, includes a third party 20 generating a recipe 60 to sell or license to a vendor 30 for the vendor 30 to use in making a bid to the prime contractor 10 for a contract to manufacture the part 40. In, alternative embodiments, the vendor 30 may create the recipe 60 for use in producing the part 40 as represented in FIG. 5. As still another alternative, as shown in FIG. 6, the vendor 30 may hire a third party 22 to create the recipe.

In the embodiment shown in FIG. 1, after the recipe is generated, a vendor is selected 70 or created 80. The third party 20,22,24,28 or an entirely different third party, shown generally as 26 in FIGS. 1 to 6, may perform the monitoring.

Figure 7:
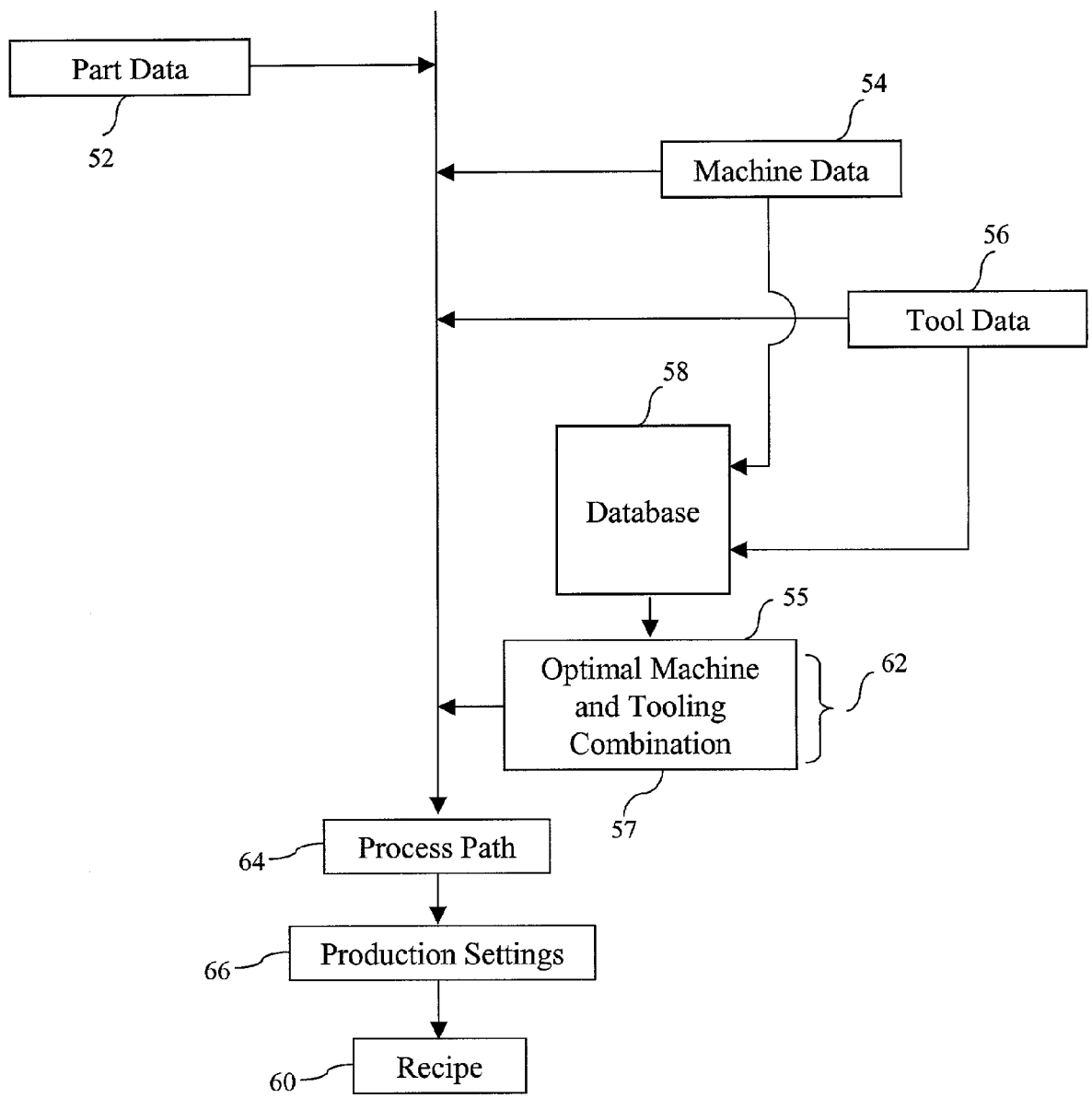
FIG. 7 comprises a detailed schematic of recipe creation of FIGS. 1 to 6.

FIG. 7 shows a recipe-generation process 50 of an embodiment of the present invention. As previously described, any party (e.g., the prime contractor 10, a third party 20,22,28, or the vendor 30) can generate the recipe 60 if provided the minimum inputs. In the embodiment shown in FIG. 1, the prime contractor 10, possibly working with a third party 20,22,28, determines the requirements for the part 40 to be manufactured, i.e., the part data 52. Included in such possible requirements are characteristics such as those in the group of quantity, material, tolerances, delivery date, delivery cost, delivery location, packaging, shape, size, dimension, weight, surface finish and coating, threading, and sharpness of corners and edges. The part 40 may need to be able to withstand certain levels of heat or pressure or fit within a predetermined structure. For example, the part 40 may require large removal volumes, have thin features, or be made of aluminum or titanium or require other workpiece material. As another example, the part may have 3-axis, 4-axis, or 5-axis features. The prime contractor 10 may simply desire certain aesthetic characteristics for the part 40. Such requirements and characteristics of the part 40, the part data 52, are used in the recipe generation or creation process of FIG. 7. The part data 52 is provided to the recipe-generating party 20.

After the part data 52 has been determined and provided to the recipe-generation party 20, the party generating the recipe 20 specifies the machine data 54 and tool data 56. The party 20 selects the machine data 54 and tool data 56 based upon part data 52, as well as related part 40, machine 55 and tooling 57 relationship characteristics. Such part and machine relationship characteristics include those in the group of part size and complexity, part removal volume, part weight, part material, machine envelope, machine power, machine spindles, machine feed rate, machine holders, machine tool assembly, machine axes count, machine acceleration axes, and machine spindle speed range. Part and tooling relationship characteristics include the part and machine relationship characteristics and tool wear, tool geometry, tool material, tool coating, tool helix and relief angles, and tool cut depth. Possible machines must be large enough and powerful enough, as well as meet other minimum requirements, to be able to produce the part. For example, the spindles may require a certain range of speeds. Just as the machine must be able to produce the part, so too must the tool be capable of producing the part. The machine and tool data at this point comprises such machines and tools that meet the minimum machine and tool performance requirements to produce the designated part. These requirements and characteristics of the machine 55 and tooling 57, the machine data 54 and tool data 56, are used in the recipe generation or creation process of FIG. 7.

Machine and tool characteristics are considered in the development of the recipe. To support this, static and dynamic response measurements are made on a periodic basis for machine and tool combinations that exist as fixed assets. This data is maintained as two classes of detailed information. Class 1 describes how particular machine and tool assemblies perform. Class 2 describes how groups of similar machine and tool assemblies perform. Based on this detailed information, machine and tool selection is done via the following steps. First, search Class 1 for a particular machine and tool combination that maximizes material removal and process repeatability while satisfying part size and machine envelop constraints. If successful, stop searching. Second, search Class 2 for machine and tool combinations that satisfy part size and machine envelop constraints. Then, rank order the acceptable combinations according to performance estimated from previous measurements. Next, test one or more particular machine and tool combinations to validate the estimate. Finally, select a machine and tool combination that maximizes material removal and process repeatability. If successful, stop searching. Third, consider part requirements and specify machine and tool characteristics according to additional processes for machine performance templates.

From the part data 52, machine data 54, and tool data 56, a party creates a recipe 60. A recipe 60 comprises an efficient description of the production of a part. A party creates the recipe refining the part, machine, and tool data 52,54,56 to produce an efficient combination of machine and tooling, a process plan, and a production setup. During this recipe generation stage, the party evaluates the previously described characteristics related to the part 40, machine 55, and tooling 57. By cumulatively evaluating and balancing these multiple factors, a party accomplishes generating a recipe 60.

More particularly, during the recipe generation stage 50, the party generating the recipe preferably considers each individual characteristic of the part 40, machine 55, and tool 57. When a party considers part characteristics, the party considers specific part characteristics 52 such as those in the following group: large removal volumes, thin features, physical dimensions, material, axis features, and number of setups to access all features. When considering machines, the party considers specific machine characteristics 54 such as those in the following group: power, speed, size, and spindles. When considering tooling, the party considers specific tool characteristics 56 such as those in the following group: part and tooling materials, tool wear and coating, and tool replacement time.

In addition to determining possible machines and tooling based on the machine and tool data 54, 56, the party generating the recipe determines the optimal combination of machine and tooling 62 best suited for producing the part 40. This choice will require the party to select a machine and tooling combination 62 which can efficiently produce the part 40 at the upper bound of the machine and tooling combination capability from the universe of available machines and tooling as limited by the machine and tool data 54,56. Using the machine data 54 and tool data 56, the party generating the recipe inputs the data into a database 58. This database 58 must include at least machine 55 and tooling 57 performance measurements for machines and related tools that can be used to produce the relevant part 40. From this database 58, the party can identify optimal specific machines 55 and classes of machines, tools 57 and classes of tools, and combinations of machines and tools 62 and classes of combinations of machines and tools. The recipe will include the maximum power for cutting with a tool using a machine.

Once a party has determined an optimal machine 55 and tooling 57 to manufacture the part 40, the party then determines a process path 64 and production settings 66 to produce the part 40 using the selected machine 55 and tooling 57. The process path 64 is generally the sequence of machined features, and the order in which the part will be physically produced from the raw material. For example, the process path 64 may include not touching previously machined thin surfaces, machining layer by layer for thin walls, starting in the least supported areas and working towards the most supported areas, alternating cuts on both sides, minimizing distortion from residual stress, minimizing required operator interaction, supporting only on opposing sides, orienting the part to maximize travel length along the highest acceleration axis, using a variety of tools and tool paths when the tool magazine is large and tool change time is very small, using a single tool with a more complex path when the magazine is very small or the tool change time is large, or minimizing velocity change.

Next, the party generating the recipe determines appropriate production settings 66. The production settings 66 comprise the specifications and values which are used when manufacturing a part 40 on a machine 55 with selected tooling 57. Production settings 66 will include specifications such as those in the following group: cutting depth, spindle speed, feed rate, temperature, heating and cooling variants, time, and operator interaction. For example, the production settings 66 may include using a high volume chilled coolant flow, slowing rotations and using coated tools on large radial cuts, or increasing rotations and uncoated tools in shallow cuts. The recipe will include the maximum settings for each of the variables on the machine, for the tool, and the setup such that the production of the part, for example, is at the maximum speed, axial depth, and maximum power for the depth of cut.

This collection of information, the part data 52, machine data 54, tool data 56, optimal machine and tooling combination 62, process path 64, and production settings 66 comprises the recipe 60. Contractors, vendors 30, or others can use the recipe 60 in the manufacture of the part 40.

Referring again to FIG. 1, after the recipe 60 has been generated 50, the vendor selector 24 either selects 70 a vendor 30 to execute the recipe 60 and create the part 40 or creates 80 a vendor 30 to execute the recipe 60 and create the part 40 or creates 80 a vendor 30 to execute the recipe 60 and create the part 40.

FIG. 8 comprises a representation of a select vendor/create vendor decision and a vendor selection process of an embodiment of the present invention. Referring to FIG. 8, from the recipe 60, the vendor selector 24 has knowledge of required equipment 55,57 for production of the part 40. In order to take advantage of this information 55,57, the selector 24 has knowledge of the existing vendors that have available the needed machines and tooling. From that universe of vendors, the vendor selector 24 preferably is able to determine which vendors have available the required machine 55 and tooling 57 for the optimal combination of machine and tooling 62 so that a vendor 30 with the required equipment and sufficient capabilities to execute the recipe and create the desired quantity of parts can be selected.

Preferably, the vendor selector 24 has access to and maintains a database of vendor information 68, the party may cross reference the recipe 60 to the database 68 to select a vendor 30. A database of vendor information 68 may include information such as those in the following group: equipment or machines, hours of operation, availability of tooling, delivery delay, and production delay. If multiple vendors 30 in the database 68 are capable of executing the recipe 60, the vendor selector 24 may select from those vendors 30 based upon additional advantageous factors and characteristics including factors and characteristics from the database such as those in the following group: time, cost, geographic, and complementary benefits. The vendor selector 24 may also select a single vendor 30 by determining if one vendor 30 can produce the part with fewer setups, possibly as few as one per side of the raw material, if, for example, viscous fluids will be required, and if an inverse fixture will be required.

Figure 10A:
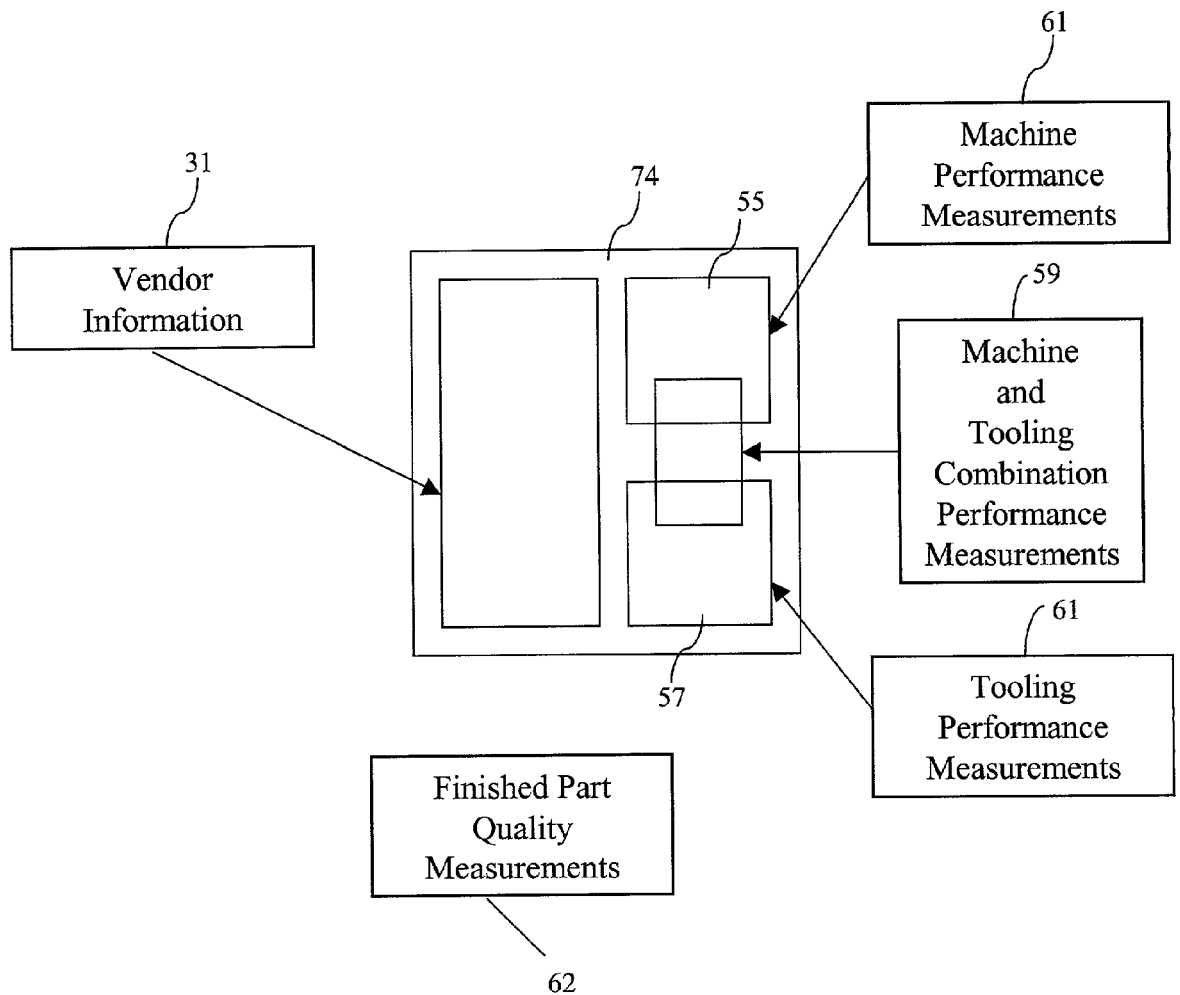
FIG. 10a comprises a detailed schematic of a single database which can be maintained by a party during the production of a part of an embodiment of the present invention for the production of a part.
Figure 10B:
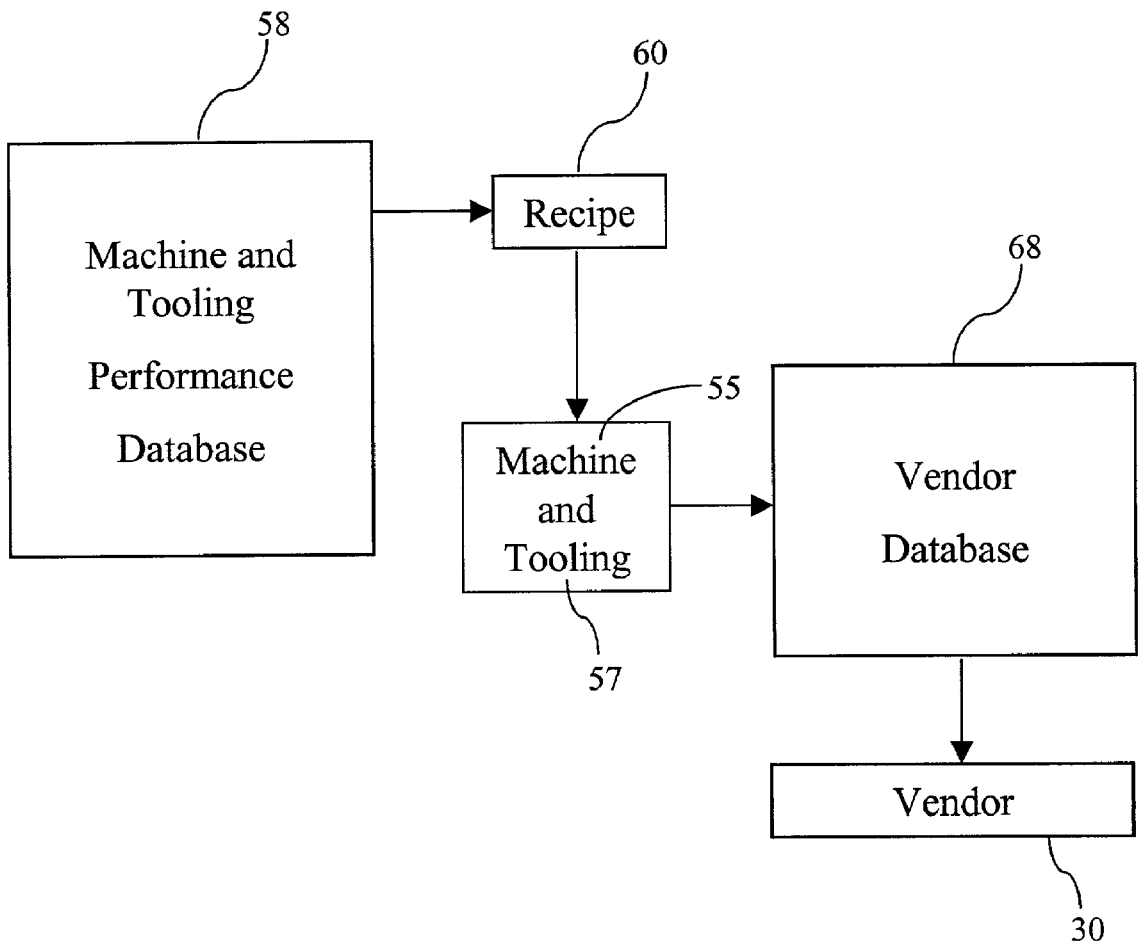
FIG. 10b comprises a detailed schematic of multiple databases which can be maintained by a party or parties during the production of a part of an embodiment of the present invention for the production of a part.

The database of machine and tooling performance 58 and the database of vendor information 68 can comprise two parts of a single database 74, as shown in FIG. 10*a*, or two separate databases, as shown in F*igure* 10*b*. A single database 74 or a database of machine and tooling performance 58 may include upper bounds of performance for specific machines 61 or classes of machines, specific tools 63 or classes of tools, and specific combinations of machines and tool assemblies 59 or classes of machines and tool assemblies. It may also include finished part quality measurements 62. From this database 58,74, a party may identify optimal classes of and specific machines 55, classes of and specific tools 57, and classes of and specific combinations of machines and tools 62. The party may update this database 58,74 to adapt to changing data such as those in the following group: requirements of a prime contractor 10 or any other market factor, available equipment, and operating vendors.

Similarly, a single database 74 or a database of vendor information 68 may include information 31 such as those in the following group: location, equipment or machines, hours of operation, availability of tooling, delivery delay, and production delay. A party may update this database 68,74 to adapt to changing data such as those in the following group: machine capabilities, tool capabilities, materials, and technological advances.

If a vendor exists that possesses the required machine and tooling to produce the part 40 according to the recipe 60, the vendor selector may choose to select 73 the vendor as the vendor 30 that will produce the part 40. Likewise, if multiple vendors exist that posses such machine(s) and tooling, the selector 24 may choose to select 73 one of such vendors as the vendor 30 that will produce the part 40. In some instances, even though vendors may exist that posses the needed machines and toolings, the vendor selector 24 may choose not to select such a vendor 81, but instead create a vendor 80.

Referring again to FIG. 8, if there is no capable vendor 82 or the vendor selector, or if there is an available vendor 72 but the vendor selector does not wish to select the available vendor 81, wishes to create a vendor 81, the vendor selector may create a vendor 80. A process for vendor creation 80 is shown in FIG. 9. Referring to FIG. 9, by specifying, from the recipe 60, the required equipment, machines 55, and tooling 57, and assembling those items, the vendor selector 24 can create a capable vendor 30,86. The vendor selector 24 can create a vendor 80 by providing an existing vendor (or vendors) 84 with additional machines 55 or tooling 57 required to manufacture the part 40 according to the recipe 60, having an existing vendor purchase or lease such machines and tooling, creating a subsidiary company to the vendor selector 24 to acquire the needed machines and tooling, or other means.

Referring again to FIG. 1, once a party has generated the recipe 60 and a vendor 30 has been selected, the vendor 30 can begin production of the part 90 according to the recipe 60. If the vendor 30, or a third party hired by the vendor, creates the recipe 60, the vendor 30 can being production of the part 90 immediately as shown in FIGS. 5 and 6. Production 90 comprises the selected/created vendor 30 carrying out the steps indicated in the recipe 60 according to the machining, tooling, and other directions provided in the recipe 60.

During production, a monitoring party 26 may monitor various aspects of production of the part 90. FIG. 11 shows an embodiment of the monitoring process 100. The monitoring party 26 may be any party, including the party desiring the part, the prime contractor 10, or a third party 20, the vendor selector 24, or other person or entity may monitor the production of the part. In the embodiment shown in FIG. 1, the monitoring party is the recipe generator 20, the third-party sub-contractor.

FIG. 11 shows an embodiment of a monitoring process 100. Referring to FIG. 11, the monitoring party 26 may monitor 110 the machining 92 carried out by the vendor 30 separately from the production 90 of the part 40 to ensure such actions as in the following group: that the correct machine is used 55, that the machine conforms to the known performance of that specific machine or class of machines, that the correct tooling is used 57, and that the machine and tooling have been setup according to the recipe 60. If the monitoring party 26 identifies an aspect of the machining 92 that should be corrected or changed 112, the party 26 can address that need 112 with the vendor 30 at that time, before the part 40 is produced 90. If the monitoring 110 does not identify any required changes 112, but that the machining is acceptable 114, the production 90 of the part 40 can begin.

Referring still to FIG. 11, if the monitoring party 26 monitors 100 the production 90 separately from the monitoring 110 of the machining 92, the party may monitor 120 for such actions as in the following group: that the vendor 30 is following the process path 64 of the recipe 60, that the vendor 30 is using the production settings 66 of the recipe 60, and that the vendor 30 is making any prescheduled or needed tooling changes 67. If the monitoring party 26 identifies an aspect of the production 90 that needs to be corrected or changed 122, the party 26 can address that need 122 with the vendor 30 at that time, before continuing production 90 that does not conform to the recipe 60. If the monitoring step 120 does not identify any required changes 122, but that the production is acceptable 124, the production 90 of the part 40 will continue unchanged.

Referring again to FIG. 1, monitoring 100 may involve steps by the monitoring party 26 such as those in the following group: contacting the vendor 30 or visiting the production site to check machine usage, tool usage, process plan implementation, and production settings. Each of these activities and values should be according to the specifications of the recipe 60 for the part at issue. The party 26 may additionally monitor 100 aspects of the production of the part 90 remotely and by testing post-production parts. This monitoring 100 effectively helps to ensure production 90 of the part 40 according to execution of the recipe 60.

Remote monitoring may include electronic monitoring of the vendor 30 via, for example, the Internet. Electronic devices capable of transmitting relevant data (e.g., speed, power, attached tools) may be attached to the machines used to produce the part by the vendor. Such data may be transmitted by the devices to the monitoring party 26. Monitoring may also comprise listening to the operation of the relevant machines via, for example, a telephone or other audio-transmitting device. The sound of the machine may allow a technician or computer diagnose various issues in relation to the machine and its operation.

An additional aspect of monitoring 100 which a party may desire is to ensure that the equipment 55,57 and process 64,66 are functioning according to the recipe 60 and producing the desired result 40. This monitoring 100 effectively ensures that an efficient recipe 60 has been created and that data in and provided from any database 58,68,74 is accurate and contemporaneous.

In another embodiment of the present invention, the monitoring party 26 monitors 100 the manufacturing of a part 40 by employing digital certificates that encode all of the required elements 52,54,55,56,57,62,64,66 of the recipe 60. The party then can evaluate the certificate at each step in the production 90 of the part 40. For example, the certificates can be encoded with the range of acceptable measurements, settings, and values such as those in the following group: chatter, power delivery, run time, tool utilization, and emergency stops.

Figure 12:
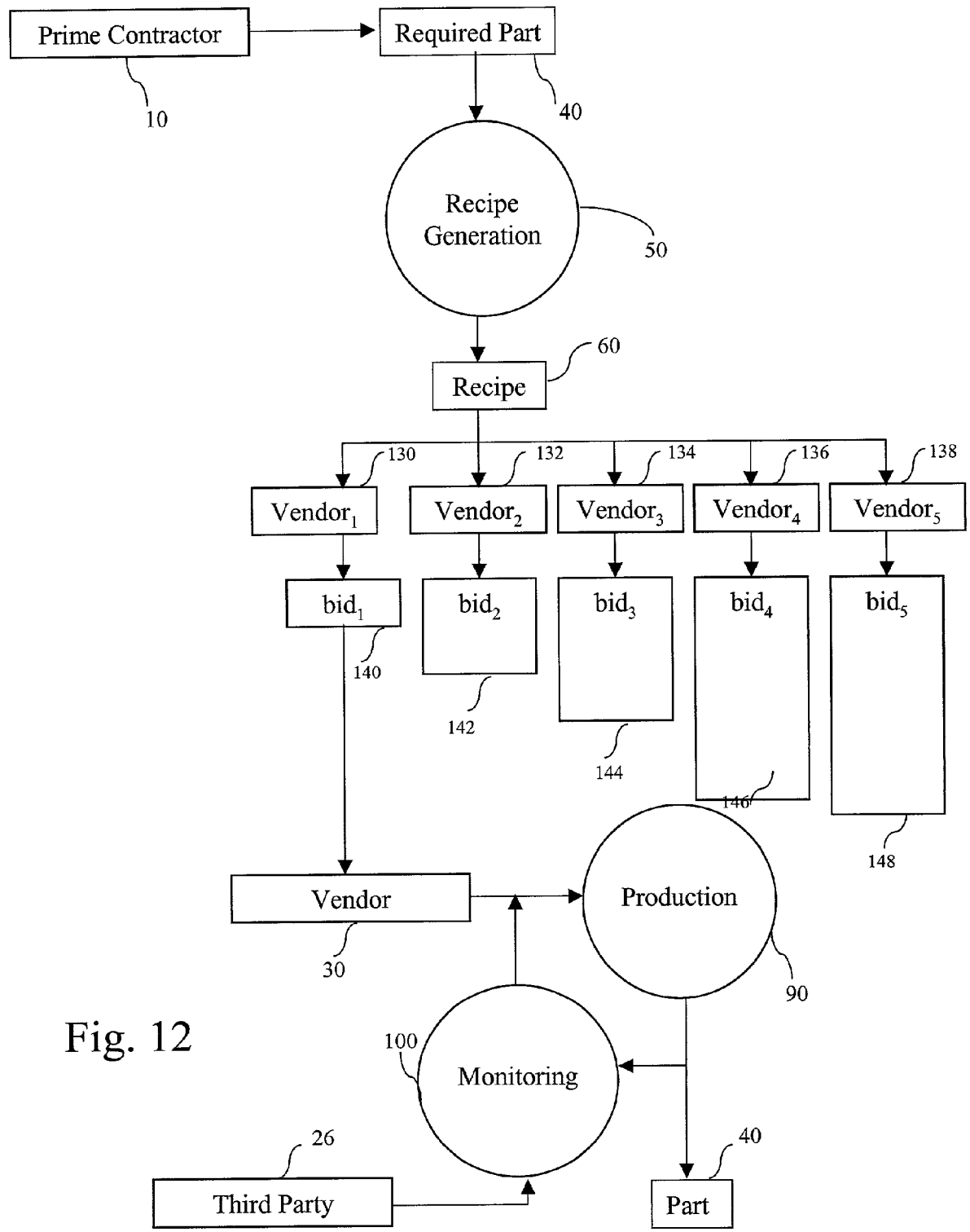
FIG. 12 comprises a schematic showing an embodiment of a method of the present invention for the production of a part.
Figure 13:
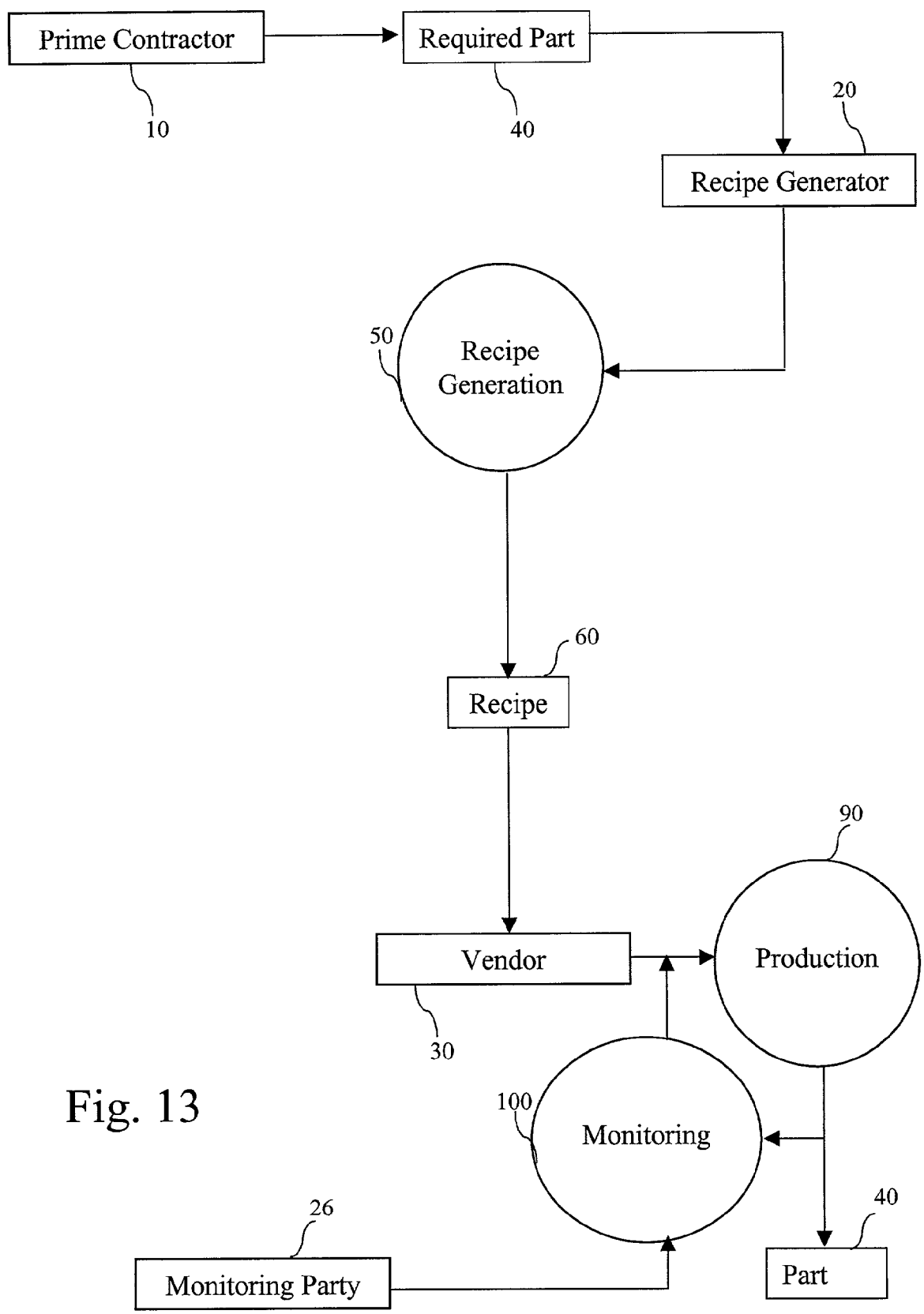
FIG. 13 comprises a schematic showing another embodiment of a method of the present invention for the production of a part.
Figure 14:
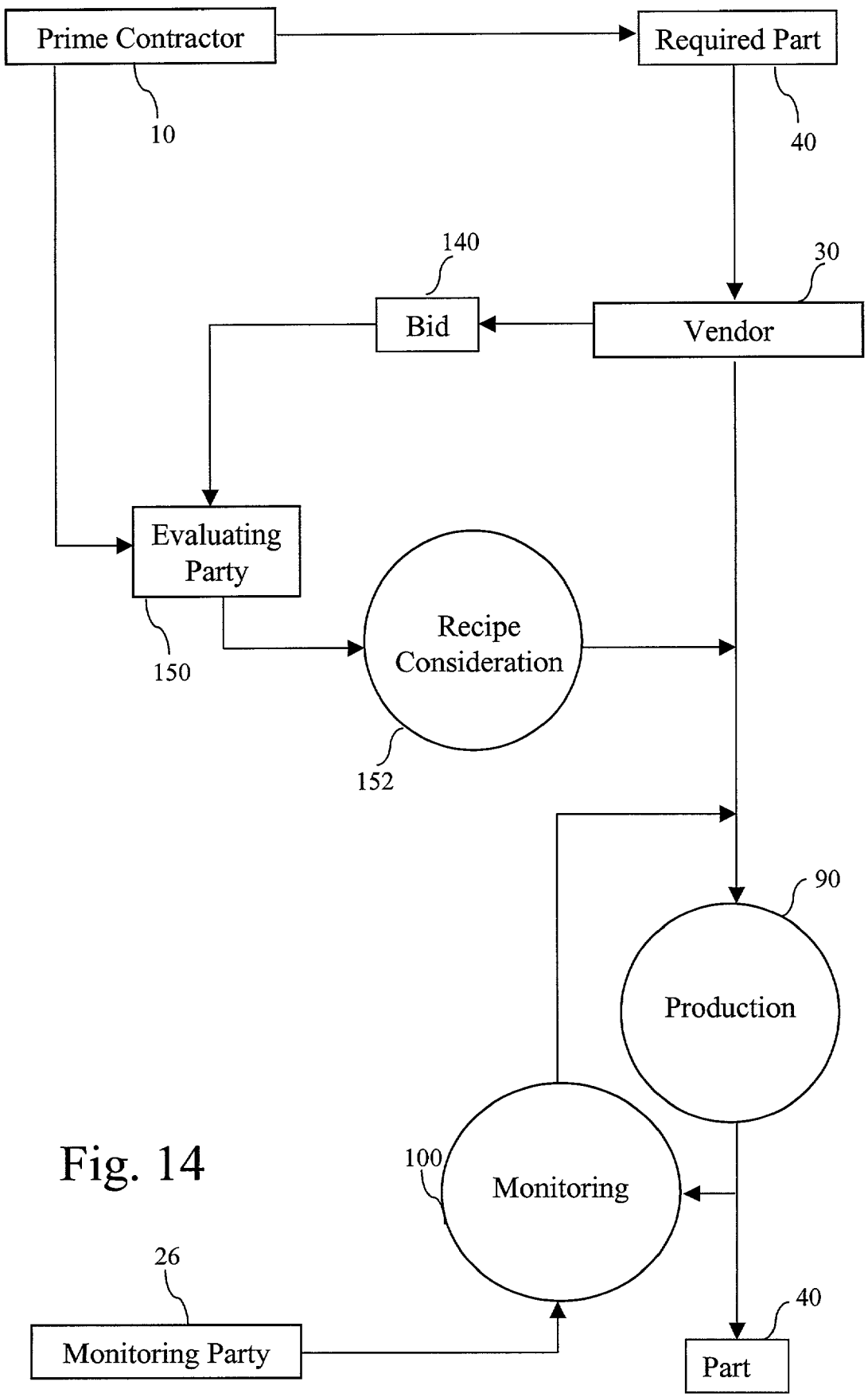
FIG. 14 comprises a schematic showing another embodiment of a method of the present invention for the production of a part.

Embodiments of the present invention include various business arrangements in relation to the systems and processes shown in FIGS. 1–11 and other embodiments of such systems and processes. FIGS. 12–14 show examples of such business arrangements.

FIG. 12 shows an embodiment of the present invention in which a prime contractor 10 generates a recipe 60 for a part 40 required by the contractor 10, and allows subcontractors 130,132,134,136,138 to submit bids 140,142,144,146,148 on the production 90 of the part 40 according to the recipe 60. After selecting the subcontractor 130, typically with the lowest bid 140, the prime contractor 10 licenses the selected subcontractor 130 (shown as vendor 30) to produce 90 the part 40 according to the recipe 60.

In another embodiment of the present invention, shown in FIG. 13, a third party (in the embodiments shown, a subcontractor) 20 generates a recipe 60 for the construction of a part 40 desired by a contractor 10 and licenses or sells the recipe 60 to a vendor 30 to use in the production 90 of the part 40. Similar embodiments are useful, as previously described, in which a vendor or subcontractor 30 generates the recipe 60, as shown in FIG. 5, or hires a third party 22 to generate a recipe 60, as shown in FIG. 6, to use in producing 90 the part 40 or when bidding on a contractor's request for a part 40. When a vendor 30 hires a third party 22 to generate a recipe 60, the third party 22 has the opportunity to generate a very specific and focused recipe 60, written and designed for the single vendor 30. The third party 22 can generate the recipe 60 around exact performance measurements from the vendor's machines and tooling.

In another embodiment of the present invention, a prime contractor 10 or vendor 30 generates the recipe 30, but makes use of a database of machine performance and tooling performance maintained by a third party 20,22,28. Like previously discussed for recipe generation, the third party 20,22,28 can maintain the database 58 with performance measurements from the specific prime contractor's or vendor's machines and tooling.

In a further embodiment of the present invention, as shown in FIG. 14, a prime contractor 10 hires an evaluating party 150 to evaluate the capability and effectiveness of a vendor 30 and the vendor's bid 140 to produce a part 40. Although the evaluator 150 would not actually need to generate a recipe 60, the third party 150 would analyze the effectiveness of the vendor 30 and its bid 140 through a recipe consideration process 152, taking into account the same factors and data 52,54,56,62,64,66 as would be used to generate a recipe 60. The recipe consideration 152 may include the third party 150 measuring the machine performance 61 and tool performance 63 of the bidding vendor 30. This embodiment allows the prime contractor 10 to consider the value and reasonableness of the vendor's bid 140 based on the evaluation or recipe consideration 152 of the third party 150. This embodiment can be characterized as vendor verification or certification by the third party 150 for the prime contractor 10.

In another embodiment of the present invention, the prime contractor 10 or a third party 20,22,28 may supply the vendor 30 with a pre-configured kit of tools 57 for a particular part recipe 60 with uniquely identified tools 50 and holders. Such tools may be sold or leased in conjunction with the recipe 60.

While the present invention has been described with respect to various features, aspects, and embodiments, the invention is not so limited. Other variations, modifications, and alternative embodiments may be made without departing from the spirit and scope of the present invention.

That which is claimed is:

1. A method of producing a part comprising:
specifying a requirement for the part to be produced;
generating a recipe for production of said part conforming to said requirement;
identifying a vendor capable of producing said part according to said recipe;
identifying an optimal machine and tooling combination for producing said part according to said recipe; and
using the optimal machine and tooling combination and the vendor to produce the part according to said recipe.

2. The method of claim 1 further comprising creating said vendor.

3. The method of claim 1 wherein identifying said vendor comprises selecting said vendor.

4. The method of claim 1 further comprising monitoring the manufacture of said part.

5. The method of claim 1 wherein generating said recipe comprises:
identifying a physical characteristic of said part;
determining the part specifications of said part;
identifying at least one machine capable of producing said part;
identifying at least one tool capable of producing said part on said machine; and
determining a production process for creating said part exhibiting said physical characteristic.

6. The method of claim 5 wherein identifying at least one machine capable of producing said part comprises identifying a plurality of machines capable of producing said part, and identifying at least one tool capable of producing said part on said machine comprises identifying a plurality of tools capable of producing said part on said machine, and wherein the method further comprises
determining at least one combination of one of said plurality of machines and one of said plurality of tools, wherein said combination is capable of producing said part.

7. The method of claim 6 wherein determining at least one combination of one of said plurality of machines and one of said plurality of tools comprises determining a plurality of combinations, and further comprising identifying one of the plurality of combinations as a combination for use in producing said part.

8. The method of claim 5 wherein said at least one machine is capable of carrying out at least part of said production process and said at least one tool is capable of carrying out at least one part of said production process.

9. The method of claim 5 further comprising determining a machine setup.

10. The method of claim 5 further comprising accessing a database comprising machine data and tool data.

11. The method of claim 3 wherein selecting the vendor comprises:
accessing a vendor database having vendor data associated with a plurality of vendors; and
selecting a combination of said recipe and one of said plurality of vendors.

12. The method of claim 8 wherein identifying the vendor comprises selecting the vendor, and selecting the vendor comprises:
accessing a vendor database having vendor data associated with a plurality of vendors; and
selecting a combination of said recipe and one of said plurality of vendors.

13. The method of claim 11 further comprising maintaining said vendor database.

14. The method of claim 11 further comprising providing said recipe to one or more of said plurality of vendors.

15. The method of claim 1, further comprising executing said recipe, wherein said recipe comprises at least one of a machine and tooling combination, a process path, a production setting, part data, machine data, and tool data.

16. The method of claim 4 wherein said monitoring comprises receiving communication from a computer network.

17. The method of claim 4 wherein said monitoring comprises receiving communication from a telephone network.

18. The method of claim 1 further comprising publishing said recipe, receiving a plurality of bids to carry out executing said recipe from a plurality of vendors, and selecting one of said plurality of vendors to carry out said executing said recipe.

19. The method of claim 7 further comprising publishing said recipe, receiving a plurality of bids to carry out executing said recipe from a plurality of vendors, and selecting one of said plurality of vendors to carry out said executing said recipe.

20. The method of claim 1 further comprising inspecting said vendor and, if said vendor meets predefined standards of capability of producing said part according to said recipe, certifying said vendor.

\* \* \* \* \*